United States Patent
Foss et al.

(10) Patent No.: US 8,266,068 B1
(45) Date of Patent: Sep. 11, 2012

(54) CANDIDATE INTERVIEW ASSISTANT

(75) Inventors: Lucinda Foss, San Francisco, CA (US); Lesley K. Grossblatt, San Francisco, CA (US); Jigna Bhatt, San Francisco, CA (US); Charles Shieh, Cupertino, CA (US)

(73) Assignee: Intuit Inc., Mountain View, CA (US)

( * ) Notice: Subject to any disclaimer, the term of this patent is extended or adjusted under 35 U.S.C. 154(b) by 548 days.

(21) Appl. No.: 12/246,406

(22) Filed: Oct. 6, 2008

(51) Int. Cl.
*G06Q 10/00* (2012.01)

(52) U.S. Cl. ...................................... 705/321; 705/7.42

(58) Field of Classification Search ............... 705/1, 1.1, 705/321, 7.42
See application file for complete search history.

(56) References Cited

U.S. PATENT DOCUMENTS

| 7,606,778 B2 * | 10/2009 | Dewar | 706/21 |
| 7,778,938 B2 * | 8/2010 | Stimac | 705/321 |
| 2003/0182171 A1 * | 9/2003 | Vianello | 705/9 |
| 2004/0093263 A1 * | 5/2004 | Doraisamy et al. | 705/11 |
| 2007/0088601 A1 * | 4/2007 | Money et al. | 705/10 |
| 2007/0185723 A1 * | 8/2007 | Shellnutt | 705/1 |
| 2009/0150432 A1 * | 6/2009 | Kane et al. | 707/104.1 |
| 2009/0299993 A1 * | 12/2009 | Novack | 707/5 |

OTHER PUBLICATIONS

Interview Connect Ref 1, 2007 www.interviewconnect.com.*
InterviewConnect, Products and Services, http://www.interviewconnect.com/products.html, 2004, 2 pages.

* cited by examiner

*Primary Examiner* — Jami A Plucinski
*Assistant Examiner* — Sangeeta Bahl
(74) *Attorney, Agent, or Firm* — Osha Liang LLP (57) ABSTRACT

The invention relates to a method to interview a candidate. The method steps include providing a virtual interview assistant comprising an interview plan, a recording module, an analysis module, and a candidate screening criteria, wherein the recording module is configured to record at least one recording selected from a group consisting of video recording, audio recording, and physiological parameter recording, and wherein the analysis module configured for analyzing the at least one recording, collecting a candidate interview response by interviewing the candidate using the virtual interview assistant based on the interview plan, wherein at least a portion of the candidate interview response is collected using the recording module, analyzing the candidate interview response using the analysis module to generate a candidate profile, and presenting the candidate profile to a recruiter based on the candidate screening criteria, wherein the recruiter makes a recruiting decision regarding the candidate based on the candidate profile.

29 Claims, 3 Drawing Sheets

CANDIDATE INTERVIEW ASSISTANT

BACKGROUND

The hiring process is not an easy process for business owners. It takes time to create and post a job posting as well as to sort through candidates' resumes, contact candidates, and schedule time for interviews. Techniques have been developed toward automating aspects of the candidate assessment process. For example, standardized reasoning tests such as the Scholastic Aptitude Test (SAT) for college admission, computerized competency and/or aptitude tests, and other automated assessment tools have been deployed for assessing the knowledge, skill, ability, character, aptitude, manner, conduct, ethics, or other characteristics of a candidate. In addition, products offered by Contexxa Corporation, located in Hackettstown, N.J., USA, such as Interview Connect (www.interviewconnect.com) seek to provide electronic interview solutions with candidates located anywhere in the world.

SUMMARY

In general, in one aspect, the invention relates to a method to interview a candidate. The method steps include providing a virtual interview assistant comprising an interview plan, a recording module, an analysis module, and a candidate screening criteria, wherein the recording module is configured to record at least one recording selected from a group consisting of video recording, audio recording, and physiological parameter recording, and wherein the analysis module configured for analyzing the at least one recording, collecting a candidate interview response by interviewing the candidate using the virtual interview assistant based on the interview plan, wherein at least a portion of the candidate interview response is collected using the recording module, analyzing the candidate interview response using the analysis module to generate a candidate profile, and presenting the candidate profile to a recruiter based on the candidate screening criteria, wherein the recruiter makes a recruiting decision regarding the candidate based on the candidate profile.

In general, in one aspect, the invention relates to a computer readable medium storing instructions for interviewing a candidate. The instructions include functionality to provide a virtual interview assistant comprising an interview plan, a recording module, an analysis module, and a candidate screening criteria, wherein the recording module is configured to record at least one recording selected from a group consisting of video recording, audio recording, and physiological parameter recording, and wherein the analysis module configured for analyzing the at least one recording, collect a candidate interview response by interviewing the candidate using the virtual interview assistant based on the interview plan, wherein at least a portion of the candidate interview response is collected using the recording module, analyze the candidate interview response using the analysis module to generate a candidate profile, and present the candidate profile to a recruiter based on the candidate screening criteria, wherein the recruiter makes a recruiting decision regarding the candidate based on the candidate profile.

In general, in one aspect, the invention relates to a system for interviewing a candidate. The system includes a processor and a memory including a plurality of instructions executed by the processor, wherein the plurality of instructions are configured to provide a virtual interview assistant comprising an interview plan, a recording module, an analysis module, and a candidate screening criteria, wherein the recording module is configured to record at least one recording selected from a group consisting of video recording, audio recording, and physiological parameter recording, and wherein the analysis module configured for analyzing the at least one recording, collect a candidate interview response by interviewing the candidate using the virtual interview assistant based on the interview plan, wherein at least a portion of the candidate interview response is collected using the recording module, analyze the candidate interview response using the analysis module to generate a candidate profile, and present the candidate profile to a recruiter based on the candidate screening criteria, wherein the recruiter makes a recruiting decision regarding the candidate based on the candidate profile.

Other aspects of the invention will be apparent from the following description and the appended claims.

DETAILED DESCRIPTION

Specific embodiments of the invention will now be described in detail with reference to the accompanying Figures. Like elements in the various Figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method to automate the interview process and relieve the recruiter from real-time burden imposed by conducting interviews with multiple candidates.

Figure 1:
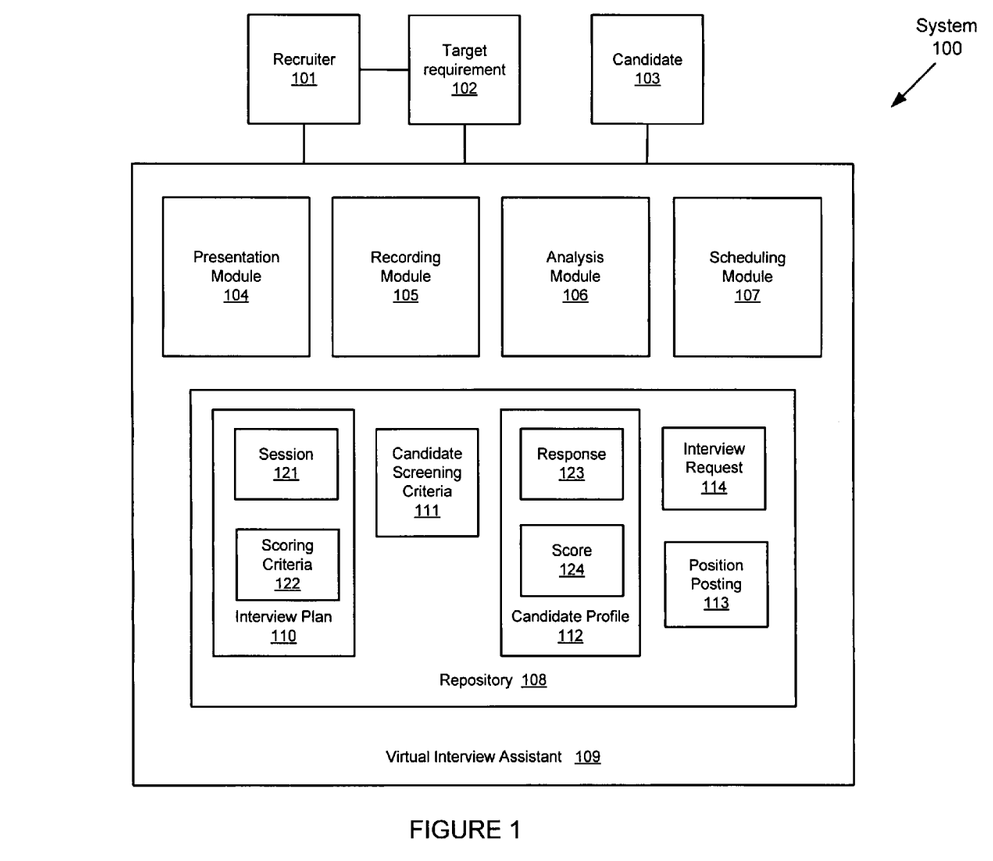
FIG. 1 depicts a schematic block diagram of a system in accordance with one or more embodiments of the invention.

FIG. 1 depicts a schematic block diagram of a system (100) in accordance with one or more embodiments of the invention. The system (100) includes recruiter (101), target requirement (102), virtual interview assistant (109), and candidate (103). Although only one recruiter and one candidate are shown in FIG. 1 where the recruiter is associated with one target requirement, those skilled in the art will recognize that multiple recruiters or multiple candidates may be included in the system (100) where each recruiter may be associated with multiple target requirements. As shown in FIG. 1, the virtual interview assistant (109) includes presentation module (104), recording module (105), analysis module (106), scheduling module (107), and repository (108). In addition, the repository (108) further includes interview plan (110), candidate screening criteria (111), candidate profile (112), interview request (114), and position posting (113). In one or more embodiment of the invention, the interview plan (110) or the candidate screening criteria (111) may be custom defined based on the target requirement (102). In one or more embodiment of the invention, the interview plan (110) or the candidate screening criteria (111) may be selected from a predefined library (not shown) based on the target requirement (102).

In one or more embodiment of the invention, the recruiter (101) is a person seeking to fill a position (not shown) using an interview (not shown) based on a target requirement (102). The person may be a business owner, an individual, an agent acting on behalf of a business or an individual, or other types of people having a need to fill a position. A recruiting decision may be made as a result of the interview to establish a relationship (e.g., a business relationship, a contractual relationship, a social relationship, or other types of relationships) between a person filling the position and the recruiter (101) or the business or individual for whom the recruiter (101) is acting as an agent. The position may be an employee position, a partner position, a service provider position, a tenant position, a roommate position, or other types of business, service, or social positions. In one or more embodiment of the invention, the candidate (103) is a person interested in filling the position sought to be filled by the recruiter (101). In one or more embodiment of the invention, the target requirement (102) may include specific personal attributes, credentials, or other documents the recruiter (101) is particularly looking for and a list of prerequisites and initial interview questions the recruiter (101) would need answers and responses from the candidate (103).

In one or more embodiment of the invention, the virtual interview assistant (109) may be configured as a stand alone workstation (e.g., a kiosk requiring personal appearance of the candidate) or a networked system (e.g., an Internet web-based system accessible by any candidate worldwide) for conducting virtual interviews with the candidate (103) on behalf of the recruiter (101). As shown in FIG. 1, the presentation module (104) is used to present electronic interview to the candidate (103). The recording module (105) is used to capture the response of the candidate (103) undergoing the interview. The analysis module (106) is used to analyze and rate the response of the candidate (103) in real-time during the interview or off-line subsequent to the interview. The scheduling module (107) is used to manage posting request for position from the recruiter (101), accepting request for interview from the candidate (103), arranging interview schedule for the candidate (103), notifying interview results to the recruiter (101), and other administrative tasks. The repository (108) is used to store various information or data required by the presentation module (104), recording module (105), analysis module (106), and scheduling module (107) for performing various tasks of the virtual interview assistant (109).

In one or more embodiment of the invention, the target requirement (102) is preferably defined to identify a candidate having desired qualifications such as knowledge, skill, ability, character, aptitude, manner, conduct, ethics, or other characteristics by way of the interview. In one or more embodiment of the invention, the electronic interview presented to the candidate (103) by the presentation module (104) is directed according to the interview plan (110) provided based on the target requirement (102). The interview plan (110) may include one or more session (121), each associated with scoring criteria (122). These interview sessions and associated scoring criteria are preferably defined to assess various qualifications of the candidate (103) such as knowledge, skill, ability, character, aptitude, manner, conduct, ethics, or other characteristics without a face to face interview process and real-time personal judgment of the recruiter (101). During the interview, the presentation module (104) may present interview situations such as questions or spontaneous scenarios for gauging a corresponding response (123) from the candidate (103). These questions or spontaneous scenarios may be presented to the candidate (103) as text based descriptions, streaming media (e.g., audio, video, etc.) presentations, or other environmental stimulus (e.g., temperature, pressure, or other sensory stimulus) during an interview session (121). In one or more embodiment of the invention, the presentation module (104) may present a pre-defined sequence of interview sessions in a narrative mode. In one or more embodiment of the invention, the presentation module (104) may deviate from the pre-defined sequence based on real-time feedback from the analysis module (106) and select a substitute session in an interactive mode.

In one or more embodiment of the invention, the recording module (105) captures any response (123) from the candidate (103) using various input devices such as text input device (e.g., computer keyboard), pointing device (e.g., computer mouse), audio device (e.g., microphone), video device (e.g., camera), physiological sensing device, etc. During an interview session (121), the corresponding response (123) may include composite information or data captured from these various input devices. While text input and pointing devices are capable of gathering responses consciously provided by the candidate (103), audio and video devices may supplement the conscious responses with additional pertinent information regarding the behavior of the candidate (103) when presented with the interview questions or spontaneous scenarios. Furthermore, physiological sensing devices may be used to capture body activities of the candidate (103) not easily controlled by the conscious mind such as body temperature, heart rate, blood pressure, skin conductivity, response time, brain wave, etc. Combinations of audio/video devices and physiological sensing devices may be used to capture composite response (e.g., including text, audio, video, physiological, or other pertinent data) that provides information missing in traditional virtual interviews conducted without face to face meeting and real-time personal judgment of the recruiter (101). In one or more embodiment of the invention, the necessary body attachments required for these physiological sensing devices may be integrated as a user friendly fixture in a less intrusive configuration than traditionally perceived. Furthermore, instructions to properly engage these sensing fixtures are provided to the candidate (103) during the interview by the virtual interview assistant (109) without additional human facilitation, for example from the recruiter (101).

In one or more embodiment of the invention, the analysis module (106) analyzes any response (123) captured by the recording module (105) during an interview session (121) based on the associated scoring criteria (122) to generate real-time analysis results (not shown). In one or more embodiment of the invention, these real-time analysis results may be used as feedback to the presentation module (104) in the interactive mode. Ultimately, these real-time analysis results are compiled and evaluated to generate a score (124) for each of the interview sessions. In addition, the analysis module (106) organizes the interview responses and scores into a candidate profile (112). In one or more embodiment of the invention, the analysis module (106) analyzes candidate answers to text based multiple choice questions against an answer template included in corresponding scoring criteria. In one or more embodiment of the invention, the analysis module (106) may perform voice stress analysis, facial stress analysis, or other suitable audio/video feature extraction and analysis techniques to analyze the captured audio/video responses for generating the analysis results. In one or more embodiment of the invention, the analysis module (106) may employ polygraph, electroencephalography, cognitive chronometry, or other emerging physiological sensing and analysis techniques to analyze the captured interview responses from the candidate (103) for generating the analysis results.

In one or more embodiment of the invention, the analysis module (106) performs these analyses automatically, in real-time or batch mode, according to the interview plan (110) without human activation, for example from the recruiter (101).

In one or more embodiment of the invention, the candidate profile (112) of the candidate (103) may be compared to the candidate screening criteria (111) to identify whether the candidate (103) is acceptable based on the target requirement (102). For example, various interview sessions may be defined with varying focuses for assessing different attributes of the candidate (103) on which the target requirement (102) may have different emphases or priorities based on the characteristics of the position which the recruiter (101) is seeking to fill. In one or more embodiment of the invention, the candidate profile (112) may include a list of scores (e.g., score (124)) rated by the analysis module (106) based on the interview responses (e.g., response (123)) captured by the recording module (105) from the candidate (103) during the interview. The candidate screening criteria (111) may include a list of minimum, maximum, or range of scores each corresponding to an interview session from the interview plan (110) to which the candidate profile of an acceptable candidate must conform. In one or more embodiment of the invention, the candidate profile (112) may include more complex heuristics for identifying an acceptable candidate based on the candidate profile.

In one or more embodiment of the invention, a position posting (113) may be posted in the stand alone workstation or the networked system of the virtual interview assistant (109) based on a request from the recruiter (101) with the target requirement (102). In one or more embodiment of the invention, an interview request (114) may be submitted by the candidate (103) in response to the position posting (113).

Figure 2:
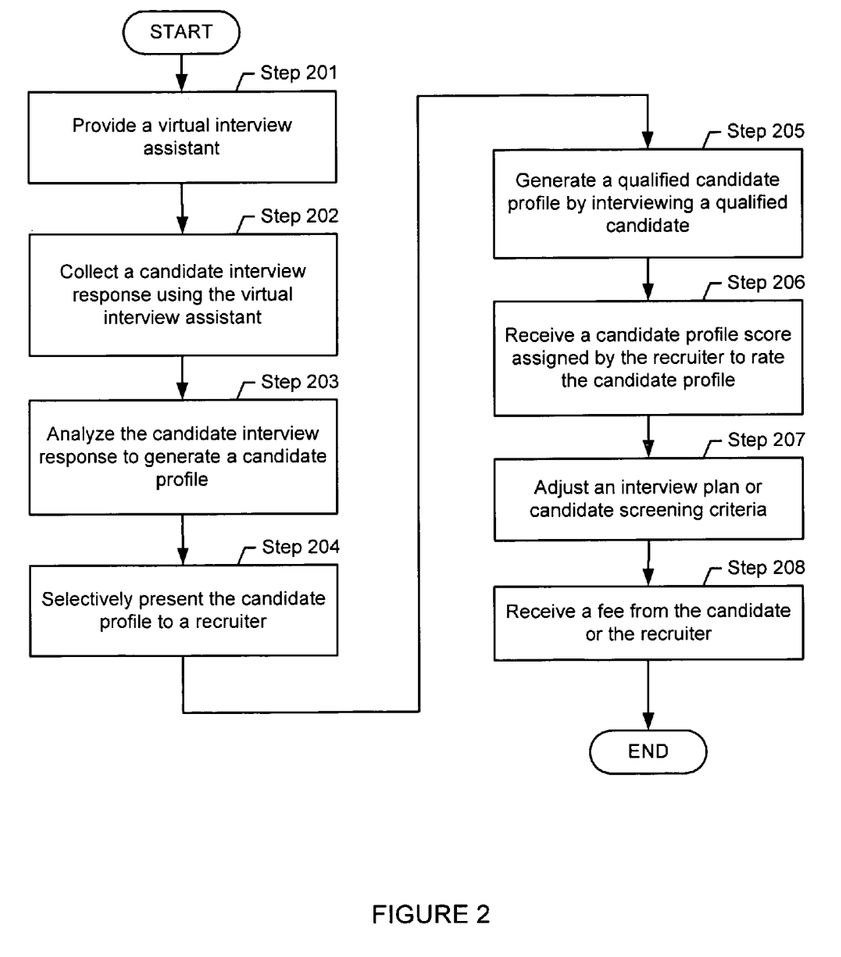
FIG. 2 depicts a flowchart of a method in accordance with one or more embodiments of the invention.

FIG. 2 depicts a flowchart of a method in accordance with one or more embodiments of the invention. The method may be practiced using system (100) described with respect to FIG. 1 above. Initially, a virtual interview assistant is provided for conducting a virtual interview with the candidate on behalf of a recruiter (Step 201). In one or more embodiment of the invention, the virtual interview assistant is configured with an interview plan, a recording module, an analysis module, and a candidate screening criteria.

In one or more embodiment of the invention, the recording module is configured for video recording, audio recording, or physiological parameter recording while the analysis module is configured for analyzing at least one such recording.

In one or more embodiment of the invention, the interview plan may include multiple sessions each preferably includes appropriate interview questions or other forms of stimulus associated with a scoring criteria for assessing the knowledge, skill, ability, character, aptitude, manner, conduct, ethics, or other characteristics of the candidate. In one or more embodiment of the invention, each session of the interview plan may be designated to be conducted with any of the video, audio, physiological parameter recordings or combinations thereof for effectively assessing the corresponding score.

In one or more embodiment of the invention, the interview plan or the candidate screening criteria may be custom defined based on a target requirement. In one or more embodiment of the invention, the interview plan or the candidate screening criteria may be selected from a predefined library based on a target requirement.

In Step 202, a candidate may be interviewed using the virtual interview assistant to collect a candidate interview response based on the interview plan. In one or more embodiment of the invention, a video, audio, and/or physiological parameter may be recorded as a part of the candidate interview response. In one or more embodiment of the invention, the candidate interview response may include multiple responses according to the multiple sessions of the interview plan.

In Step 203, the candidate interview response is analyzed using the analysis module to generate a candidate profile. In one or more embodiment of the invention, the candidate profile may include multiple scores generated from multiple responses based on the corresponding scoring criteria. In one or more embodiment of the invention, the recorded video, audio, and/or physiological parameter may be analyzed using, for example voice stress analysis, facial stress analysis, other suitable audio/video feature extraction and analysis techniques, polygraph, electroencephalography, cognitive chronometry, or other emerging physiological sensing and analysis techniques for generating the score based on the corresponding scoring criteria with regard to the knowledge, skill, ability, character, aptitude, manner, conduct, ethics, or other characteristics of the candidate.

In one or more embodiment of the invention, the score may be generated in real-time during the interview. In such embodiments, the score may be used to determine subsequent interview questions and or other forms of stimulus designated in the interview plan. In one or more embodiment of the invention, the score may be generated off-line subsequent to the interview.

In one or more embodiment of the invention, the candidate profile is selectively presented to the recruiter based on requirements or specifications of the candidate screening criteria such that the recruiter may make a recruiting decision regarding the candidate (Step 204). For example, different positions sought to be filled by the recruiter may requires different score weightings with regard to the knowledge, skill, ability, character, aptitude, manner, conduct, ethics, or other characteristics of the candidate as specified in the candidate screening criteria.

In one or more embodiment of the invention, a qualified candidate profile may be generated by interviewing (e.g., in a mock interview) a qualified candidate based on the interview plan. The qualified candidate may be identified by the recruiter and assigned a pre-determined qualification score based on a target requirement for the position (Step 205). For example, the qualified candidate may be a current employee, partner, service provider, tenant, roommate, or a person already in various types of business, service, or social positions with acceptable performance and/or satisfactory track record on which the pre-determined qualification score may be based. Using the qualified candidate profile and the pre-determined qualification score as a reference, the interview plan and/or the candidate screening criteria may be adjusted so that the virtual interview results in an acceptable candidate better fitting the target requirement (Step 207).

In one or more embodiment of the invention, a candidate profile score may be assigned by the recruiter to rate the candidate profile presented by the virtual interview assistant based on a target requirement (Step 206). For example, an acceptable candidate passing the screening of the virtual interview assistant may be judged by the recruiter as a perfect match, a close match, a barely acceptable match, or an unacceptable candidate. Using the candidate profile score as a feedback, the interview plan and/or the candidate screening criteria may be adjusted so that the virtual interview results in an acceptable candidate better fitting the target requirement (Step 207).

Whether the interview plan and/or the candidate screening criteria is custom defined or selected from predefined library based on the target requirement of the position sought to be filled by the recruiter, the adjustments described above may be performed iteratively to continuously improve the virtual interview assistant to provide better match of screened candidate as compared to the target requirement.

In one or more embodiment of the invention, candidate profiles presented to the recruiter but not accepted for the current position may be stored or provided to other recruiters for consideration with regard to a future position or different position sought to be filled by other recruiters.

In one or more embodiment of the invention, a fee may be received from the candidate or the recruiter for the service provided by the virtual interview assistant, for example for accepting the request for interview or presenting the screened candidate profile to the recruiter (Step 208).

Figure 3:
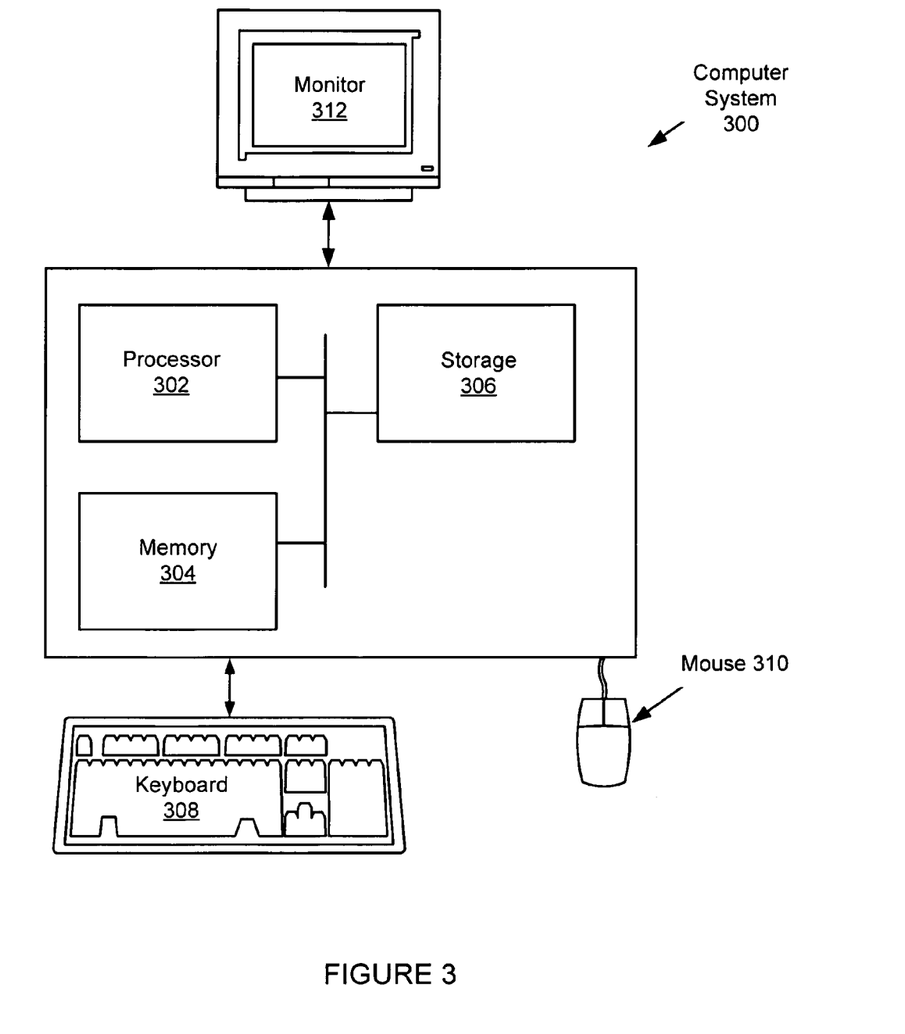
FIG. 3 depicts a computer system in accordance with one or more embodiments of the invention.

Embodiments of the invention may be implemented on virtually any type of computer regardless of the platform being used. For example, as shown in FIG. 3, a computer system (300) includes one or more processor(s) (302), associated memory (304) (e.g., random access memory (RAM), cache memory, flash memory, etc.), a storage device (306) (e.g., a hard disk, an optical drive such as a compact disk drive or digital video disk (DVD) drive, a flash memory stick, etc.), and numerous other elements and functionalities typical of today's computers (not shown). The computer (300) may also include input means, such as a keyboard (308), a mouse (310), or a microphone (not shown). Further, the computer (300) may include output means, such as a monitor (312) (e.g., a liquid crystal display (LCD), a plasma display, or cathode ray tube (CRT) monitor). The computer system (300) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (300) includes at least the minimal processing, input, and/or output means necessary to practice embodiments of the invention.

Further, those skilled in the art will appreciate that one or more elements of the aforementioned computer system (300) may be located at a remote location and connected to the other elements over a network. Further, embodiments of the invention may be implemented on a distributed system having a plurality of nodes, where each portion of the invention (e.g., report generator, event manager, user application, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to interview a candidate, comprising:
providing a virtual interview assistant comprising an interview plan, a recording module, an analysis module, and candidate screening criteria,
  wherein the interview plan comprises one or more interview sessions,
  wherein the recording module is configured to record at least one recording selected from a group consisting of video recording, audio recording, and physiological parameter recording,
  wherein the analysis module is configured for analyzing the at least one recording, and
  wherein the candidate screening criteria comprise an acceptance criterion for each of the one or more interview sessions;
obtaining a pre-determined qualification score representing a level of a current employee fitting a target requirement,
  wherein the pre-determined qualification score is assigned to the current employee based on a performance track record of the current employee in a position held by the current employee, and
  wherein the current employee is identified as a qualified candidate by a recruiter based on the target requirement;
interviewing, in a mock interview subsequent to identifying the current employee, the current employee using the virtual interview assistant to generate a qualified candidate profile;
adjusting the interview plan to generate an adjusted interview plan based on the qualified candidate profile and the pre-determined qualification score;
collecting, using the processor, a candidate interview response by interviewing the candidate using the virtual interview assistant based on the adjusted interview plan, wherein at least a portion of the candidate interview response is collected using the recording module;
analyzing the candidate interview response using the analysis module to generate candidate profile information comprising a score for each of the one or more interview sessions; and
selectively presenting the candidate profile information to the recruiter in response to the candidate profile information meeting the candidate screening criteria,
  wherein each score in the candidate profile information confirms to the acceptance criterion in the candidate screening criteria for a corresponding one of the one or more interview sessions, and
  wherein the recruiter makes a recruiting decision regarding the candidate based on the candidate profile information.

2. The method of claim 1,
wherein the interview plan comprises a plurality of sessions and a plurality of scoring criteria corresponding to the plurality of sessions,
wherein the candidate interview response comprises a plurality of responses corresponding to the plurality of sessions, and
wherein the candidate profile information comprises a plurality of scores generated from the plurality of responses based on the plurality of scoring criteria.

3. The method of claim 1, wherein at least one selected from a group consisting of the interview plan and the candidate screening criteria is custom defined based on the target requirement.

4. The method of claim 1, wherein at least one selected from a group consisting of the interview plan and the candidate screening criteria is selected from a predefined library based on the target requirement.

5. The method of claim 1, further comprising:
adjusting the candidate screening criteria, prior to the presenting step, based on the qualified candidate profile and the pre-determined qualification score;
rating the candidate profile information, subsequent to the presenting step and in response to the recruiter judging the candidate based on the target requirement, to assign a candidate profile score representing a level of success of the virtual interview assistant to pass an acceptable candidate fitting the target requirement; and
further adjusting at least one selected from a group consisting of the interview plan and the candidate screening criteria based on the candidate profile score,
wherein the acceptance criterion comprises at least one selected from a group consisting of a score minimum, a score maximum, a score range, and a score weighting.

6. The method of claim 1, further comprising:
receiving a request from the recruiter with the target requirement;
generating a position posting using the virtual interview assistant based on the request; and
interviewing the candidate based on a request for interview submitted from the candidate responsive to the position posting.

7. The method of claim 6, further comprising:
receiving a fee from the candidate for accepting the request for interview.

8. The method of claim 1, further comprising:
receiving a fee from the recruiter based on presenting the candidate profile information to the recruiter.

9. The method of claim 1, further comprising:
storing the candidate profile information for at least one selected from a group consisting of a different position, a future position, a different recruiter, and a different employer,
wherein the candidate is interviewed by the virtual interview assistant for the recruiter based on a current position of an employer.

10. The method of claim 1, further comprising providing environmental stimulus to the candidate for gauging a response from the candidate.

11. The method of claim 1, further comprising deviating from a pre-defined sequence of the interview plan based on real-time feedback from the analysis module.

12. A non-transitory computer readable medium storing instructions for interviewing a candidate, the instructions when executed by a processor comprising functionality to:
provide a virtual interview assistant comprising an interview plan, a recording module, an analysis module, and candidate screening criteria,
wherein the interview plan comprises one or more interview sessions,
wherein the recording module is configured to record at least one recording selected from a group consisting of video recording, audio recording, and physiological parameter recording,
wherein the analysis module is configured for analyzing the at least one recording, and
wherein the candidate screening criteria comprise an acceptance criterion for each of the one or more interview sessions;
obtain a pre-determined qualification score representing a level of a current employee fitting a target requirement,
wherein the pre-determined qualification score is assigned to the current employee based on a performance track record of the current employee in a position held by the current employee, and
wherein the current employee is identified as a qualified candidate by a recruiter based on the target requirement;
interviewing, in a mock interview subsequent to identifying the current employee, the current employee using the virtual interview assistant to generate a qualified candidate profile;
adjust the interview plan to generate an adjusted interview plan based on the mock interview score qualified candidate profile and the pre-determined qualification score;
collect a candidate interview response by interviewing the candidate using the virtual interview assistant based on the adjusted interview plan, wherein at least a portion of the candidate interview response is collected using the recording module;
analyze the candidate interview response using the analysis module to generate candidate profile information comprising a score for each of the one or more interview sessions; and
selectively present the candidate profile to the recruiter in response to the candidate profile information meeting the candidate screening criteria,
wherein each score in the candidate profile information confirms to the acceptance criterion in the candidate screening criteria for a corresponding one of the one or more interview sessions, and
wherein the recruiter makes a recruiting decision regarding the candidate based on the candidate profile information.

13. The computer readable medium of claim 12,
wherein the interview plan comprises a plurality of sessions and a plurality of scoring criteria corresponding to the plurality of sessions,
wherein the candidate interview response comprises a plurality of responses corresponding to the plurality of sessions, and
wherein the candidate profile information comprises a plurality of scores generated from the plurality of responses based on the plurality of scoring criteria.

14. The computer readable medium of claim 12, wherein at least one selected from a group consisting of the interview plan and the candidate screening criteria is custom defined based on the target requirement.

15. The computer readable medium of claim 12, wherein at least one selected from a group consisting of the interview plan and the candidate screening criteria is selected from a predefined library based on the target requirement.

16. The computer readable medium of claim 12, the instructions further comprising functionality to:
adjust the candidate screening criteria, prior to the presenting step, based on the qualified candidate profile and the pre-determined qualification score;
rate the candidate profile information, subsequent to the presenting step and in response to the recruiter judging the candidate based on the target requirement, to assign a candidate profile score representing a level of success of the virtual interview assistant to pass an acceptable candidate fitting the target requirement; and
further adjust at least one selected from a group consisting of the interview plan and the candidate screening criteria based on the candidate profile score, wherein the acceptance criterion comprises at least one selected from a group consisting of a score minimum, a score maximum, a score range, and a score weighting.

17. The computer readable medium of claim 12, the instructions further comprising functionality to:

receive a request from the recruiter with a target requirement;

generate a position posting using the virtual interview assistant based on the request; and interview the candidate based on a request for interview submitted from the candidate responsive to the position posting.

18. The computer readable medium of claim 17, the instructions further comprising functionality to:

receive a fee from the candidate for accepting the request for interview.

19. The computer readable medium of claim 12, the instructions further comprising functionality to:

receive a fee from the recruiter based on presenting the candidate profile information to the recruiter.

20. The computer readable medium of claim 12, the instructions further comprising functionality to:

store the candidate profile information for at least one selected from a group consisting of a different position, a future position, a different recruiter, and a different employer, wherein the candidate is interviewed by the virtual interview assistant for the recruiter based on a current position of an employer.

21. A system for interviewing a candidate, comprising:

a processor; and a memory comprising a plurality of instructions executed by the processor, wherein the plurality of instructions are configured to:

provide a virtual interview assistant comprising an interview plan, a recording module, an analysis module, and candidate screening criteria, wherein the interview plan comprises one or more interview sessions, wherein the recording module is configured to record at least one recording selected from a group consisting of video recording, audio recording, and physiological parameter recording, wherein the analysis module is configured for analyzing the at least one recording, and wherein the candidate screening criteria comprise an acceptance criterion for each of the one or more interview sessions;

obtain a pre-determined qualification score representing a level of a current employee fitting a target requirement, wherein the pre-determined qualification score is assigned to the current employee based on a performance track record of the current employee in a position held by the current employee, and wherein the current employee is identified as a qualified candidate by a recruiter based on the target requirement;

interviewing, in a mock interview subsequent to identifying the current employee, the current employee using the virtual interview assistant to generate score qualified candidate profile;

adjust the interview plan to generate an adjusted interview plan based on the qualified candidate profile and the pre-determined qualification score;

collect a candidate interview response by interviewing the candidate using the virtual interview assistant based on the adjusted interview plan, wherein at least a portion of the candidate interview response is collected using the recording module;

analyze the candidate interview response using the analysis module to generate a candidate profile information comprising a score for each of the one or more interview sessions; and selectively present the candidate profile information to the recruiter in response to the candidate profile information meeting the candidate screening criteria, wherein each score in the candidate profile confirms to the acceptance criterion in the candidate screening criteria for a corresponding one of the one or more interview sessions, and wherein the recruiter makes a recruiting decision regarding the candidate based on the candidate profile information.

22. The system of claim 21, wherein the interview plan comprises a plurality of sessions and a plurality of scoring criteria corresponding to the plurality of sessions, wherein the candidate interview response comprises a plurality of responses corresponding to the plurality of sessions, and wherein the candidate profile information comprises a plurality of scores generated from the plurality of responses based on the plurality of scoring criteria.

23. The system of claim 21, wherein at least one selected from a group consisting of the interview plan and the candidate screening criteria is custom defined based on the target requirement.

24. The system of claim 21, wherein at least one selected from a group consisting of the interview plan and the candidate screening criteria is selected from a predefined library based on the target requirement.

25. The system of claim 21, the plurality of instructions further comprising functionality to:

adjust the candidate screening criteria, prior to the presenting step, based on the qualified candidate profile and the pre-determined qualification score;

rate the candidate profile information, subsequent to the presenting step and in response to the recruiter judging the candidate based on the target requirement, to assign a candidate profile score representing a level of success of the virtual interview assistant to pass an acceptable candidate fitting the target requirement; and further adjust at least one selected from a group consisting of the interview plan and the candidate screening criteria based on the candidate profile score, wherein the acceptance criterion comprises at least one selected from a group consisting of a score minimum, a score maximum, a score range, and a score weighting.

26. The system of claim 21, the plurality of instructions further comprising functionality to:

receive a request from the recruiter with a target requirement;

generate a position posting using the virtual interview assistant based on the request; and interview the candidate based on a request for interview submitted from the candidate responsive to the position posting.

27. The system of claim 26, the plurality of instructions further comprising functionality to:

receive a fee from the candidate for accepting the request for interview.

28. The system of claim 21, the plurality of instructions further comprising functionality to:
   receive a fee from the recruiter based on presenting the candidate profile information to the recruiter.

29. The system of claim 21, the plurality of instructions further comprising functionality to:
   store the candidate profile information for at least one selected from a group consisting of a different position, a future position, a different recruiter, and a different employer,
   wherein the candidate is interviewed by the virtual interview assistant for the recruiter based on a current position of an employer.

* * * * *